Patented Nov. 1, 1949

2,486,674

UNITED STATES PATENT OFFICE 2,486,674

LUBRICATING GREASE

William W. Pedersen, Midland, Mich., assignor to The Dow Chemical Company, Midland, Mich., a corporation of Delaware No Drawing. Application July 18, 1945, Serial No. 605,823

9 Claims. (Cl. 252—49.6)

This invention relates to a new composition of matter which possesses lubricating properties and which is particularly adapted for the lubrication of ball or roller types of bearings. It is particularly concerned with a grease comprising a large proportion of a liquid organo-silicon oxide polymer and a lesser quantity of an inorganic thickening material which controls the consistency of the product.

Ball and roller bearings are frequently employed in motors and other machinery used in hot surroundings or operating under conditions of great changes in temperature. It is an object of this invention to provide a lubricant for ball or roller bearings which is effective over an exceptionally wide range of temperatures and which is substantially non-volatile and resistant to oxidation. Other and further objects will appear from the following description.

It is well known that mineral oils are thickened to a grease-like consistency with colloidal materials such as metal soaps. However, the viscosity of a mineral oil increases rapidly as the temperature of operation is decreased, and a grease prepared from a mineral oil is subject to large changes in consistency with varying temperature conditions. Furthermore, at elevated temperatures, e. g. above 120° C., greases based on petroleum oils are usually subject to excessive volatilization of the oil component which results in thickening and eventual hardening of the residual material.

I have found that the combination or mixture of a major portion of a liquid organo-silicon oxide polymer and a minor portion of a substantially neutral, finely divided, highly porous carbon black provides a grease which varies only slightly in consistency and retains its original lubricating properties over a wide range of temperatures, e. g. from —50° C. to 200° C. or even higher.

The liquid organo-silicon oxide polymers which are particularly useful as ingredients of the lubricating grease of this invention are substantially non-volatile throughout a wide temperature range, e. g. from —50° C. to 250° C. or above. In general, these oily fluids have a flatter temperature-viscosity slope relationship, lower vapor pressure, greater freedom from volatility, higher flash points and greater resistance to oxidation than petroleum oils of equivalent viscosity as measured at ordinary temperatures. I may use a liquid organo-silicon oxide polymer which has a viscosity within the range of from about 3 to about 1000 centistokes, depending upon the intended use of the grease made therefrom. The liquid organo-silicon oxide polymers may be either linear or cyclic in molecular structure and often comprise both linear and cyclic compounds. The silicon atoms of the organo-silicon oxide polymers are joined to other silicon atoms through an oxygen linkage, e. g. Si—O—Si, and all valences of the silicon atoms not taken up by such linkages are satisfied by organic radicals attached to the silicon atoms through a carbon to silicon bond. The organic radicals may be alkyl radicals such as methyl, ethyl, propyl, isopropyl, butyl, amyl, hexyl to octadecyl and higher; alicyclic radicals such as cyclohexyl; aryl and aralkyl radicals such as phenyl, benzyl, tolyl, naphthyl, etc.

The organo-silicon oxide polymers described above may be readily prepared by hydrolysis of organosilanes containing one or more desired hydrocarbon radicals attached to the silicon atom, the remaining valences of said silicon atom being satisfied by hydrolyzable groups such as halogens, hydrocarbonoxy radicals, amino groups, etc. Usually the hydrolysis is accomplished by heating one or more of such hydrolyzable organosilanes together with water and a minor amount of a mineral acid, e. g. sulphuric or hydrochloric acid, to a temperature of 70° C. or higher. During the reaction, the hydrolysis products undergo condensation to form the organo-silicon oxide polymers. For example, a mixture of approximately nineteen moles of diethoxy dimethyl silane, $(CH_3)_2Si(OC_2H_5)_2$, and one mole of ethoxy trimethyl silane, $(CH_3)_3SiOC_2H_5$, may be hydrolyzed by the action of water containing a small amount of sulfuric acid. Condensation takes place concurrently, and an oily liquid is obtained as the product. After thoroughly washing with water to remove traces of acid, the liquid may be heated at 0.5 inch absolute pressure to a temperature of approximately 250° C. for the purpose of vaporizing and removing the more volatile components, e. g. low molecular weight polymers. The residual material consists of a liquid which is suitable for use in preparing the composition of this invention.

As a thickener for the liquid organo-silicon oxide polymer, I prefer to use a substantially neutral carbon black which is of a finely divided or finely porous form presenting a large surface area per unit weight of the carbon. A carbon black which has a surface area of from 15 to 20 acres per pound, (134 to 178 square meters per gram), is particularly advantageous. The preferred carbon black has a relatively small particle size, e. g. an average diameter of approximately 250 Angstrom units. It is important that the carbon black be substantially neutral, that is, a water extract of the black should have a pH of from 5.5 to 9.5 and preferably from 6.5 to 8.5. The most satisfactory carbon blacks are commercial products which have been processed, e. g. calcined, to remove adsorbed organic impurities. A water extract of a carbon black which has been so treated usually shows a hydrogen ion concentration of from 6.5 to 9.0 as measured on a glass-electrode pH meter.

Although the liquid organo-silicon oxide polymer and carbon black may be mixed in proportions varying between wide limits, the preferred compositions contain from about 2 per cent to 25 per cent, and usually from 4 to 12 per cent, of the carbon black, the balance consisting substantially of the organo-silicon oxide polymer. However, other substances may be incorporated, such as additives for inhibiting corrosion of metal bearings under special operating conditions, e. g. in the presence of moisture. In general, the ingredients may be intimately blended by any desired means of mixing, e. g. by passing the mixture several times through a three-roll paint dispersion mill. Thereafter, it is frequently desirable to warm the pasty mass to 110° C. or thereabout to expel occluded air, gases, etc., which it may contain. The blending may then be finished by further treatment in the mixing apparatus. The consistency of the product is dependent to a large extent on the proportion of carbon black present in the composition, that is, the higher the percentage of carbon black the thicker the product. A grease prepared in the manner just described changes only slightly in consistency under varying conditions of operation and temperature, and exhibits very little "bleeding" or separation into its components, as will be seen from the following examples, which are illustrative only, and are not to be construed as limiting the invention:

Example 1

An organo-silicon oxide polymer composed of approximately 95 mole per cent of $(CH_3)_2SiO_{1.0}$ units, and approximately 5 mole per cent of $(CH_3)_3SiO_{0.5}$ units consisted of an oil having the following properties:

Boiling point _____°C__ above 250
Freezing point _____°C__    −55
Flash point _____°C__ above 500
Vicosity, −40° C. _____ centistokes__   270
Viscosity, 0° C. _____do____    85
Viscosity, 25° C. _____do____    50
Viscosity, 100° C. _____do____    16

To 91.3 parts by weight of the above fluid were added 8.7 parts by weight of a carbon black having the following properties:

Average diameter of particle _____Angstrom units__ 250
Surface area_____square meters per gram__ 142
pH of water extract_____ 8.2

A black having these properties is marketed under the name of "Battery Black No. 2047," by Godfrey L. Cabot, Inc. The mixture of fluid and carbon black was stirred mechanically and then heated overnight in an oven maintained at 115° C. It was then passed several times through a three-roll paint mill, at which time a microscopic examination showed that the carbon black was colloidally dispersed.

The resultant grease showed no evidence of thixotropy; that is, it did not increase appreciably in stiffness on standing. It had a grease penetration value of from 31.5 to 32.0 mm., as determined by method D 217–44 T, of the American Society For Testing Materials. The grease did not freeze or harden during two-weeks' storage at −40° C. Oil separation or bleeding, determined by a procedure based on Army-Navy Grease Specification AN–G–3A was less than 10 per cent. For example, ten grams of the grease were weighed into a 60 mesh screen cone, which was then suspended in a clean beaker of known weight and placed in an oven maintained at a temperature of 200° C. After heating for 24 hours, the amount of oil which separated and dropped into the beaker was determined by weighing the beaker. The bleeding amounted to 9.98 per cent. The grease was non-volatile at room temperature. Heating to 200° C. for 24 hours resulted in a loss in weight amounting to 6.4 per cent. The average acid number of the grease as determined by A. S. T. M. method, D 663–44 T, was approximately 0.0331. Lubricating qualities were tested in a size 212 ball bearing operating at 1750 R. P. M. at a temperature of 175° C., without load. It gave effective lubrication for 127 hours under these conditions.

In comparison, a standard high quality petroleum-based grease with soap thickener designed for use at elevated temperatures provided adequate lubrication only for a period of from 24 to 40 hours under the same test conditions. Subsequent examination of this grease showed that it had stiffened to a paste so heavy that it would no longer permit free running of the bearing.

Example 2

A liquid organo-silicon oxide polymer consisting essentially of 40 mole per cent of $C_6H_5CH_3SiO_{1.0}$ units, 49 mole per cent of $(CH_3)_2SiO_{1.0}$ units, and 11 mole per cent of $(CH_3)_3SiO_{0.5}$ units, and having a viscosity of 140 centistokes at 25° C., a boiling point above 310° C./0.5 mm., a freezing point of approximately −50° C. and a flash point of above 500° F., was thickened with carbon black, of the quality described above. To 91.06 parts by weight of the fluid were added 8.94 parts of the carbon black, and the dispersion conducted as described in Example 1. The resultant grease had an unworked grease penetration value of from 28.7 to 29.9 mm. and showed no evidence of thixotropy. The acid number of the grease varied from 0.031 to 0.036. A sample of the grease heated for 50 hours at 200° C. showed only 5.2 per cent bleeding and a weight loss due to volatility of less than 10 per cent. This grease was an efficient lubricant in a 212 size ball bearing at 1725 R. P. M. at 175° C., without load for more than 400 hours.

I claim:

1. A lubricating grease composition consisting essentially of a liquid silicone polymer containing monovalent hydrocarbon radicals attached to silicon as the only organic radicals, free from olefinic and acetylenic linkages, thickened to a grease consistency with up to 25% of carbon black.

2. A lubricating grease comprising from 98 to 75 per cent by weight of a normally liquid organo-silicon oxide polymer substantially non-volatile at 250° C., the organic portion of which consists of mono-valent hydrocarbon radicals, free of olefinic and acetylenic linkages, and attached to silicon through carbon-silicon linkages, and from 2 to 25 per cent of a substantially neutral finely divided carbon black.

3. A lubricating grease comprising from 96 to 88 per cent by weight of a normally liquid organo-silicon oxide polymer, substantially free of low polymers which are volatile at 250° C./0.5 mm., the organic portion of which consists of mono-valent hydrocarbon radicals, free of olefinic and acetylenic linkages, and attached to silicon through carbon-silicon linkages, and from 4 to 12 per cent of a substantially neutral, finely divided carbon black colloidally dispersed therein.

4. A composition for the lubrication of ball bearings and roller bearings which comprises from 98 to 75 per cent by weight of a substantially non-volatile, normally liquid organo-silicon oxide polymer, the organic substituents of which consist of mono-valent hydrocarbon radicals, free of olefinic and acetylene linkages, and attached directly to the silicon atoms, and from 2 to 25 per cent of a substantially neutral, finely divided carbon black, colloidally dispersed therein.

5. A composition having the consistency of a grease and suitable for the lubrication of ball bearings and roller bearings, which comprises from 96 to 88 per cent by weight of a substantially non-volatile, normally liquid organo-silicon oxide polymer, the organic substituents of which consist of mono-valent hydrocarbon radicals, free of olefinic and acetylene linkages, and attached directly to the silicon atoms, and from 4 to 12 per cent of a substantially neutral, finely divided carbon black, colloidally dispersed therein.

6. A composition, as claimed in claim 4, wherein the normally liquid organo-silicon oxide polymer comprises monovalent hydrocarbon radicals, free from olefinic and acetylenic linkages, as the only organic radicals of the molecule and includes an alkyl radical attached to a silicon atom.

7. A composition, as claimed in claim 4, wherein the normally liquid organo-silicon oxide polymer is one comprising alkyl and phenyl radicals as the organic radicals thereof.

8. A composition, as claimed in claim 5, wherein the organic radicals of the normally liquid organo-silicon oxide are methyl radicals.

9. A composition, as claimed in claim 5, wherein the normally liquid organo-silicon oxide polymer comprises methyl and phenyl radicals as the organic radicals thereof.

WILLIAM W. PEDERSEN.

REFERENCES CITED

The following references are of record in the file of this patent:

UNITED STATES PATENTS

| Number | Name | Date |
|---|---|---|
| 1,590,800 | Becker | June 29, 1926 |
| 2,375,007 | Larson | May 1, 1945 |
| 2,382,082 | McGregor | Aug. 14, 1945 |

OTHER REFERENCES

Chemical & Metallurgical Engineering, vol. 51, August 1944, page 136.

Preliminary Data, New Dow Corning Products. Dow Corning Corp., Midland, Michigan. Product Dow Corning Lubricating Greases, 1 page, received February 17, 1945.